(12) United States Patent
Schultz

(10) Patent No.: US 9,789,450 B2
(45) Date of Patent: Oct. 17, 2017

(54) BEVERAGE GASIFICATION SYSTEM

(71) Applicant: TechniBlend, Inc., New Berlin, WI (US)

(72) Inventor: Peter Schultz, Elm Grove, WI (US)

(73) Assignee: Techniblend, Inc., New Berlin, WI (US)

( * ) Notice: Subject to any disclaimer, the term of this patent is extended or adjusted under 35 U.S.C. 154(b) by 0 days.

(21) Appl. No.: 15/213,883

(22) Filed: Jul. 19, 2016

(65) Prior Publication Data

US 2017/0209841 A1  Jul. 27, 2017

Related U.S. Application Data

(60) Provisional application No. 62/286,545, filed on Jan. 25, 2016.

(51) Int. Cl.

| | |
|---|---|
| B01F 3/00 | (2006.01) |
| B01F 3/04 | (2006.01) |
| A23L 2/54 | (2006.01) |
| A23L 2/70 | (2006.01) |
| C12C 11/11 | (2006.01) |
| C12G 1/09 | (2006.01) |
| C12G 1/06 | (2006.01) |
| C12H 1/065 | (2006.01) |
| B01F 3/22 | (2006.01) |

(52) U.S. Cl.
CPC ............ B01F 3/04808 (2013.01); A23L 2/54 (2013.01); A23L 2/70 (2013.01); B01F 3/04787 (2013.01); B01F 3/04815 (2013.01); B01F 3/22 (2013.01); C12C 11/11 (2013.01); C12G 1/06 (2013.01); C12G 1/062 (2013.01); C12H 1/061 (2013.01); A23V 2002/00 (2013.01); B01F 2003/049 (2013.01); B01F 2003/04921 (2013.01); B01F 2215/007 (2013.01); B01F 2215/0022 (2013.01); B01F 2215/0068 (2013.01); B01F 2215/0072 (2013.01)

(58) Field of Classification Search
CPC .......... B01F 2215/0072; B01F 3/04787; B01F 3/04815
USPC .................... 99/323.2, 323.1; 261/37, 24, 20
See application file for complete search history.

(56) References Cited

U.S. PATENT DOCUMENTS

| | | | | |
|---|---|---|---|---|
| 5,537,914 | A * | 7/1996 | Gibney | ................ B67D 1/0016 137/101.19 |
| 8,940,347 | B2 * | 1/2015 | Hassan | ............... B01F 7/00766 261/37 |
| 2014/0263446 | A1 * | 9/2014 | Quittner | ............... B67D 1/0058 222/129.1 |

FOREIGN PATENT DOCUMENTS

WO  00/25904  5/2000

\* cited by examiner

*Primary Examiner* — Reginald L Alexander
(74) *Attorney, Agent, or Firm* — Boyle Fredrickson, S.C.

(57) ABSTRACT

A beverage gasification system for concurrently extracting solid particulates from a solution of a liquid and a gas and increasing absorption of the gas into the liquid, in which a particle separator is located downstream of a gas supply assembly. A method of forming a clarified gasified beverage is also disclosed, in which gas is injected into the liquid at a location upstream of the point at which solids are removed from the liquid.

16 Claims, 5 Drawing Sheets

BEVERAGE GASIFICATION SYSTEM

CROSS-REFERENCE TO RELATED APPLICATION

This application claims priority from U.S. Provisional Patent Application No. 62/286,545, which was filed on Jan. 25, 2016, the subject matter of which is incorporated by reference in its entirety.

BACKGROUND OF THE INVENTION

1. Field of the Invention

This invention relates to a system for gasifying liquids, and more particularly to a gasification system for beverages or the like.

2. Discussion of the Related Art

In the production of gasified beverages, such as beer, sparkling wine, carbonated fruit beverages, etc., it has been known in the past to inject a gas, such as carbon dioxide or nitrogen, into the liquid and to then pass the liquid solution with the injected gas through conduit or piping that has a number of elbows and turns, which facilitate gas absorption and homogenization in the liquid solution. In systems such as this, the gas is injected under fairly high pressure so as to cause turbulence at the injection site to facilitate initial absorption. In the production of beverages that may include solids or particulate material, such as (but not limited to) beer, the gas is injected into the liquid after the solids have been removed, such as by use of a centrifuge or the like in a manner as is known.

One of the draw backs of the conventional systems for gasified beverages is the use of a high pressure gas supply to induce absorption of the gas in the liquid beverage. Such a high pressure gas supply often requires more energy and expense to operate. Additionally, the complicated conduit/piping necessary to form the desired turbulence for increasing gas absorption adds additional complexity and expense to the beverage manufacturing process. Nonetheless, even through the use of high pressure gas supplies and complicated turbulators, maximum gas absorption is not always achieved.

Accordingly, there is need for an improved beverage gasification system that increases gas absorption into beverage liquid without the use of a high pressure gas supply source or a complicated turbulator structure. There is also need for a system that streamlines the beverage manufacturing process by integrating a solution for removal of solid particulates that may be suspended in the beverage liquid.

SUMMARY OF THE INVENTION

The present invention contemplates a beverage gasification system in which gas is injected into the liquid at a location upstream of the point at which solids are removed from the liquid, as opposed to downstream from the solids removal location as in the prior art. By injecting gas into the liquid upstream of the solids removal location, the equipment that is employed to remove the solids also functions to cause absorption and homogenization of the gas into the liquid.

According to one aspect of the invention, a beverage gasification system is provided for forming a clarified gasified beverage. The beverage gasification system includes a liquid supply source configured to provide a liquid containing solid particulates therein. The downstream outlet of the liquid supply source is in fluid communication with a gas supply assembly that is configured to introduce a gas into the liquid, resulting in a solution of liquid and gas that is supplied to a particle separator; wherein the particle separator is configured to concurrently extract the solid particulates from the solution and increase absorption of the gas into the liquid to form a clarified gasified beverage.

According to another aspect of the invention, the particle separator is a centrifuge.

According to another aspect of the invention, the gas supplied at gas supply assembly is selected from at least one of carbon dioxide gas and nitrogen gas.

According to another aspect of the invention, a method of forming a clarified gasified beverage is provided. The method includes supplying a volume of liquid containing solid particulates therein to a gas supply assembly and then mixing the volume of liquid containing solid particulates with a volume of gas in the gas supply assembly to form a solution of liquid and gas. The resultant solution of liquid and gas is then passed through a centrifuge to concurrently extract the solid particulates from the solution and increase absorption of the gas into the liquid to form a clarified gasified beverage.

According to another aspect of the invention, the pressure of the gas in the solution is less than the pressure of the gas in the clarified gasified beverage.

According to another aspect of the invention, the absorption of the gas in the solution is less than the absorption of the gas in the clarified gasified beverage.

According to another aspect of the invention, the homogenization of the gas and liquid in the solution is less than the homogenization of the gas and liquid in the clarified gasified beverage.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
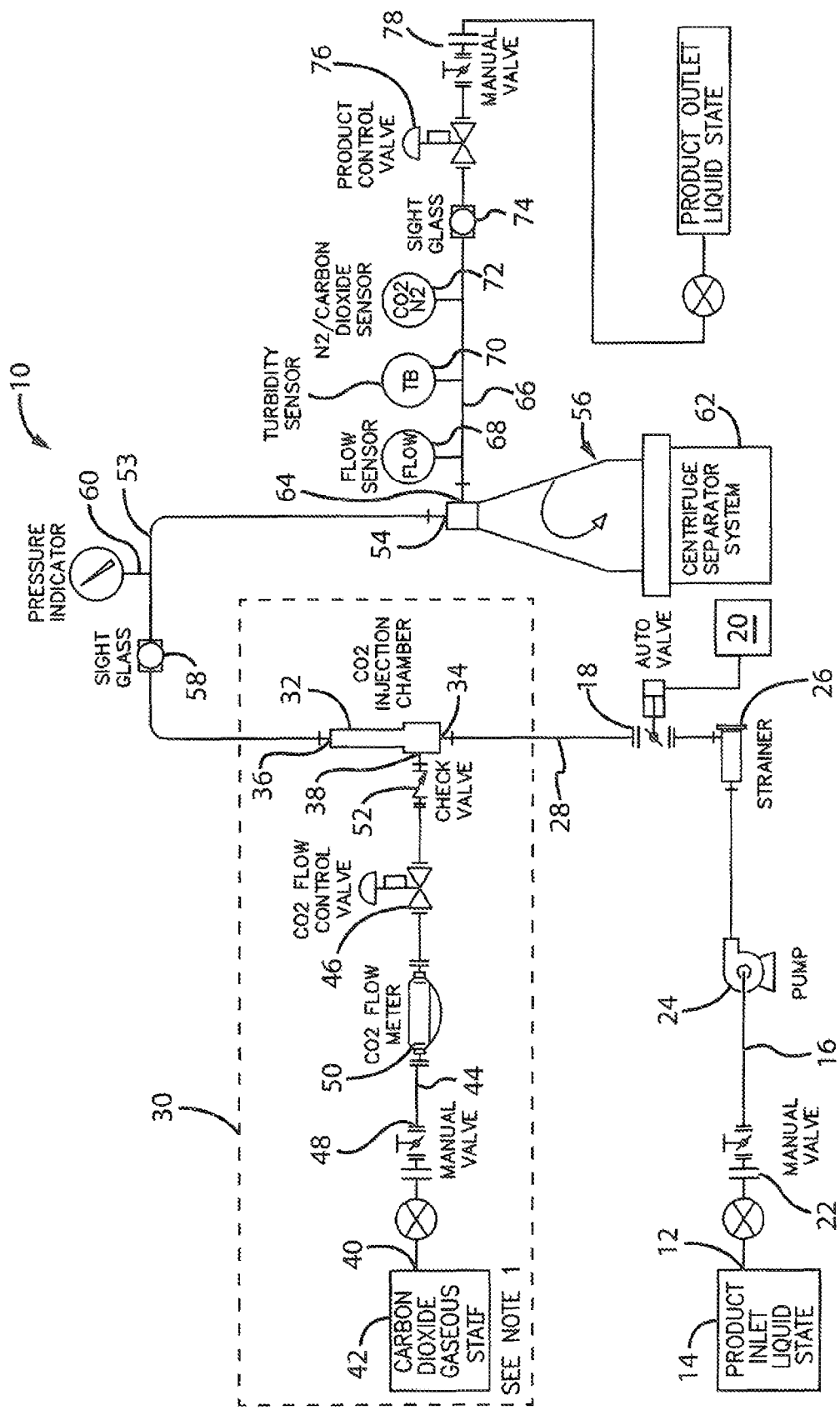
FIG. 1 is a schematic diagram of a gasification system in a general application in accordance with one embodiment of the present invention.

Specific embodiments of the present invention will be described by the following non-limiting examples which will serve to illustrate various features of the invention. With reference to the drawing figures in which like reference numerals designate like parts throughout the disclosure, a representative embodiment of the present invention is incorporated in a beverage gasification system 10, shown initially in FIG. 1.

I. First Illustrative Embodiment

As shown in FIG. 1, a liquid with solids or particulate material is supplied via a downstream outlet 12 of a liquid supply source 14 to a supply line 16. In a representative application, the liquid may be in the form of beer or other brewed beverage that contains solids or particulates as a product of the brewing process, such as yeast, hops, etc. It is understood, however, that the liquid provided at liquid supply source 14 and supplied via supply line 16 may be any liquid into which a gas is to be injected, and that contains solids or particulates that are destined for removal. Supply line 16 is provided with a valve 18 for regulating the flow of the supplied liquid into the system 10. Valve 18 may be manually activated or electronically controlled via a controller 20. Supply line 16 may also be provided with an upstream manual valve 22, positioned adjacent the downstream outlet 12 of the liquid supply source 14, for manually regulating the introduction of the supplied liquid into the system 10. Within supply line 16, and between the valves 18 and 22, a fluid pump 24 is provided. In the illustrated embodiment, the fluid pump 24 is configured to supply the liquid, which contains particulates, through a strainer 26, past valve 18 and into the upstream inlet 28 of the gas supply assembly 30 at a flow rate and pressure greater than the flow rate and pressure of the liquid containing particulates exiting the liquid supply source 14.

The at least one gas supply assembly, shown generally at 30, is provided for injecting gas into the liquid, which contains particulates, and includes at least one injection chamber 32. The at least one injection chamber 32 includes a first upstream inlet 34 that is in fluid communication with the downstream outlet 12 of the liquid supply source 12 via supply line 16, and a downstream outlet 36 through which a solution of combined liquid and gas is discharged. The gas that is introduced into the injection chamber 32 is received at a second upstream inlet 38 of the injection chamber 32. The second upstream inlet 38, which introduces gas into the injection chamber 32, is in fluid communication with the downstream outlet 40 of a pressurized gas supply source 42 via a gas supply line 44. In one embodiment of the present invention, the gas supply source 42 provides a source of carbon dioxide ($CO_2$) gas. In an alternative embodiment of the present invention the gas supply source 42 provides a source of nitrogen ($N_2$) gas. It is understood, however, that the gas supply assembly 30 may include a single gas source or any number of gas sources, as desired, and that any type of gas or gases may be supplied.

In the illustrated embodiment shown in FIG. 1, the gas is provided from the downstream outlet 40 of the gas supply source 42 and into supply line 44 that supplies gas to the second upstream inlet 38 of the injection chamber 32. Supply line 44 is provided with a gas flow control valve 46 for regulating the flow of the gas into the system 10. Valve 46 may be manually activated or electronically controlled via controller 20. Supply line 44 may also be provided with an upstream manual valve 48, positioned adjacent the downstream outlet 40 of the gas supply source 42, for manually regulating the flow of the gas into the system 10. Additionally, within supply line 44, and between the valves 46 and 48, a flowmeter 50 is provided, which may also be interconnected with the controller 20. In the illustrated embodiment, the flowmeter 50 is configured to transmit a signal to the controller 20, indicating the rate of flow of the gas through the supply line 44. In response to receiving the signal from the flowmeter 50, the controller 20 may regulate the status of the control valve 46, so as to provide the injection chamber 32 with a selectively regulated volume and pressure of gas. Finally, supply line 44 may also include a check valve 52 positioned adjacent the second upstream inlet 38 of the injection chamber 32, such that the gas and/or liquid provided to the injection chamber 32 is prevented from flowing upstream into supply line 44.

Downstream of gas supply assembly 30, the combined liquid and gas, i.e., solution of liquid and gas, is discharged from the downstream outlet 36 of the injection chamber 32 and enters conduit or line 53. Line 53 is in fluid communication with the upstream inlet 54 of a particle separator 56. Line 53 may also include a sight glass 58 and/or a pressure indicator 60 between the downstream outlet 36 of the injection chamber 32 and the upstream inlet 54 of the particle separator 56. In one embodiment, the pressure indicator 60 may transmit a signal indicative of the fluid pressure in line 53 to the controller 20.

Still referring to FIG. 1, in the illustrated embodiment, the separator 56 may be in the form of a conventional centrifuge 62. A representative centrifuge 62 may be a disk centrifuge such as is available from the Seital Separation Technology division of SPX under its designation SE161, although it is understood that separator 56 may be of any other brand, type or model, or alternatively may be any other satisfactory type of separation equipment such as, but not limited to, a cyclonic separator, filter press, etc. Within the centrifuge 62, the solution of gas and liquid, containing particulates, is subjected to centrifugal forces that function to remove solids or particles contained within the liquid, in a manner as is known.

In use, the centrifugal force applied to the liquid and gas solution as it passes through centrifuge 62 functions to aid in the absorption and homogenization of the gas into and within the liquid. In this regard, when the clarified gaseous liquid, e.g. beverage, is discharged from the downstream outlet 64 of the centrifuge 62, the gas is at least as fully absorbed into the liquid as would be the case in a conventional gas injection and serpentine conduit system as described above. The centrifuge 62 thus provides the dual and concurrent function of solid particulate removal and gas absorption and homogenization. Resultantly, system 10 eliminates the need for additional serpentine conduits or turbulators for gas absorption as compared to conventional systems in which the gas is injected downstream of a particle separator. In addition, it has been found that the pressure of the gas within the liquid and gas solution is increased as the solution passes through the centrifuge 62. In view of this, the pressure of the gas that is injected into the liquid at gas injection assembly 30 may be lower than the gas pressure required in the prior art in order to achieve the desired degree of absorption and homogenization.

The resultant clarified gasified liquid, or beverage, is then discharged from the downstream outlet 64 of the centrifuge 62 and supplied to a discharge line 66. As shown in FIG. 1, the discharge line 66 may be provided with one or more sensors, including but not limited to a flow sensor 68, a turbidity sensor 70 and/or a gas sensor 72. Any or all of the sensors may be configured to transmit a signal indicative of their respective sensor readings to the controller 20. A sight glass 74 may also be provided along the length of the discharge line 66 to allow viewing of the clarified gasified liquid therein. A flow control valve 76 configured to regulate the flow rate of the liquid and gas solution through centrifuge 62 may also be provided in the discharge line 66. The flow control valve may be a manual valve or an electronic valve, operation of which is controlled by the controller 20. Finally, a manual valve 78 may be provided at the downstream end of the discharge line, which is configured to discharge the clarified gasified liquid or beverage therefrom.

Figure 3:
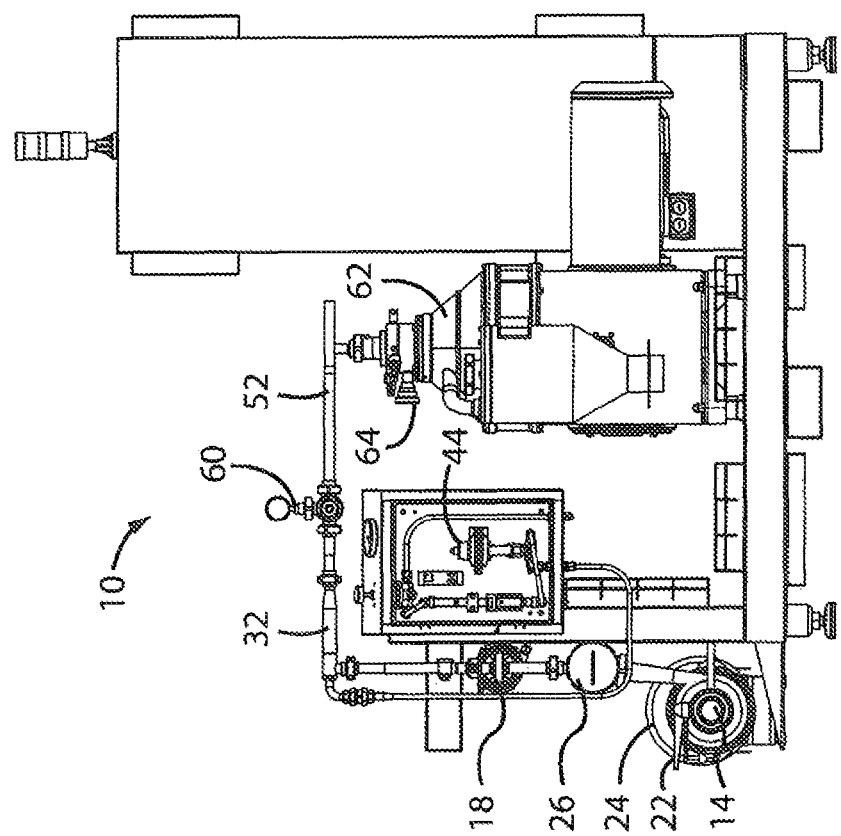
FIG. 3 is a rear elevation view of a gasification system used to produce clarified gasified beverage in accordance with FIG. 1.
Figure 2:
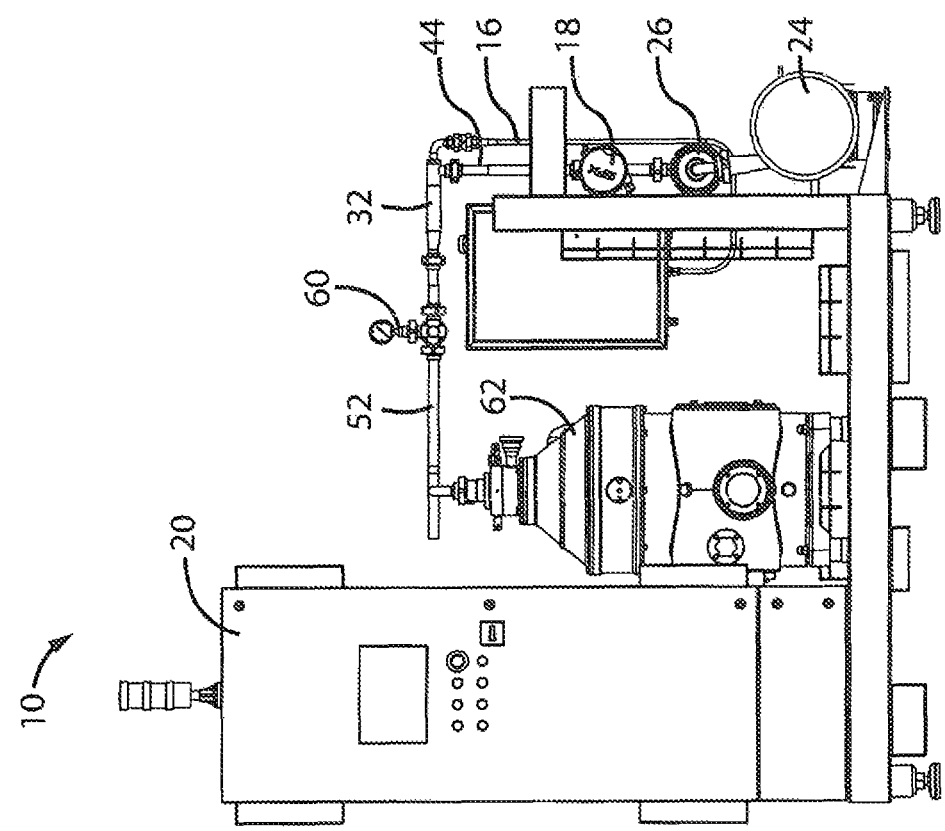
FIG. 2 is a front elevation view of a gasification system used to produce a clarified gasified beverage in accordance with FIG. 1.

FIGS. 2 and 3 similarly illustrate the apparatus of the beverage gasification system 10, as is described above.

Figure 4:
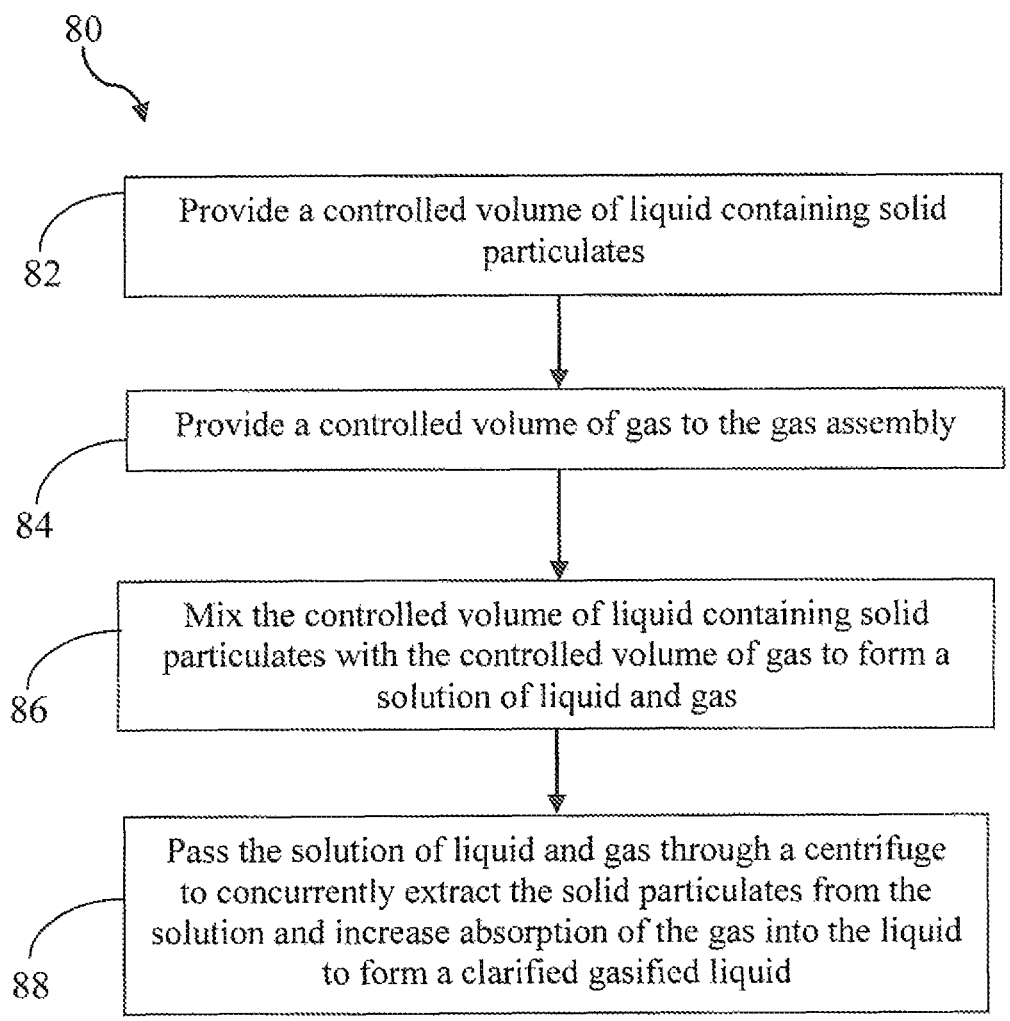
FIG. 4 is a flow chart of a method of using the gasification system of FIG. 1

Referring now to the simplified flow chart represented in FIG. 4, during use of system 10, an exemplary method of manufacturing or forming a clarified gasified beverage is shown at arrow 80. As represented at initial block 82, a controlled volume of a liquid containing solid particulates is introduced into the system 10 by way of a liquid supply source 12 and controlled by regulation of valve 18 via controller 20. At block 84, a controlled volume of a gas is provided to the gas supply assembly 30 from the gas supply source 42 via supply line 44. At box 86, the liquid containing solid particulates is mixed with the gas provided from the gas supply source 42 at the injection chamber 32 to form a solution of liquid and gas. At subsequent box 88, the solution of gas and liquid is passed through a centrifuge to concurrently extract the solid particulates from the solution and increase absorption of the gas into the liquid, thereby forming a clarified gasified liquid or beverage. In one embodiment of the method 80, the gas is carbon dioxide. In another alternative embodiment, the gas is nitrogen gas, however it should be understood that the application is in no way limited to these gasses, as noted above.

II. Second Illustrative Embodiment

Turning now the FIG. 5, a second illustrative embodiment of the present invention is shown, as will be described below. In the following second illustrative embodiment of the present invention and in drawing FIGS. 5 and 6, reference is made to reference numerals, which have been increased by 100 relative to the previously described first illustrative embodiment, and like numbers designate like parts throughout.

Figure 5:
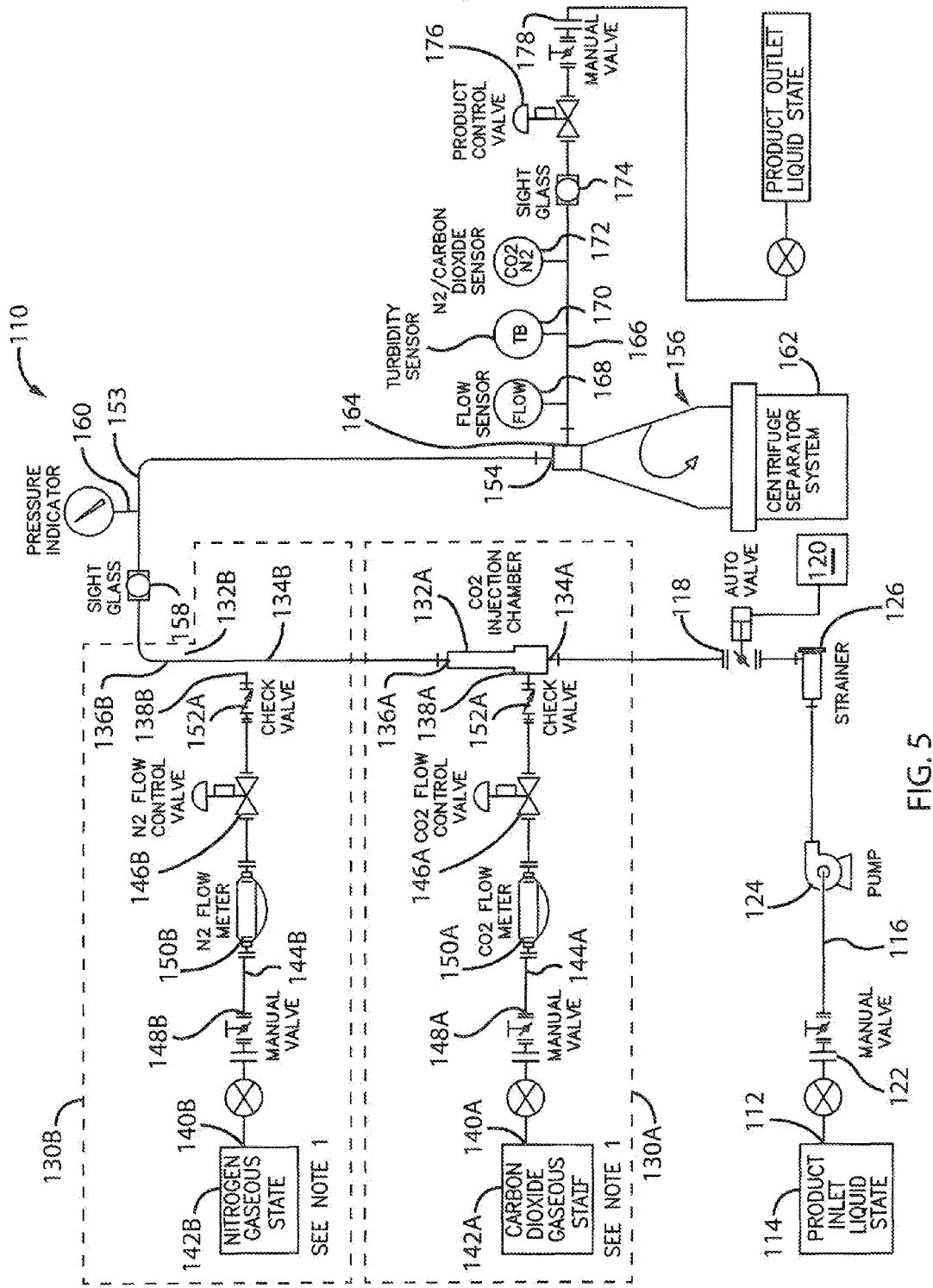
FIG. 5 is a schematic diagram of a gasification system in a general application in accordance with an alternative embodiment of the present invention.

As shown in FIG. 5, system 110 primarily differs from the previously disclosed system 10, in that system 110 includes both a first gas supply assembly 130A and second gas supply assembly 130B, whereas system included a single gas supply assembly 30. Accordingly, the first gas supply assembly 130A and the second gas supply assembly 130B may allow selective introduction of at least two distinct gasses, such as carbon dioxide and nitrogen, into a liquid. Alternatively, the first gas supply assembly 130A and the second gas supply assembly 130B of system 110 may allow for two distinct gasses to be introduced into the same liquid as is passes through the gasification system 110.

Referring initially to FIG. 5, system 110 is adapted to process a liquid with solids or particulate material that is supplied via a downstream outlet 112 of a liquid supply source 114 to a supply line 116. As was previously discussed, in a representative application, the liquid may be in the form of beer or other brewed beverage that contains solids or particulates as a product of the brewing process, such as yeast, hops, etc. It is understood, however, that the liquid provided at liquid supply source 114 and supplied via supply line 116 may be any liquid into which a gas is to be injected, and that contains solids or particulates that are destined for removal. Supply line 116 is provided with a valve 118 for regulating the flow of the supplied liquid into the system 110. Valve 118 may be manually activated or electronically controlled via a controller 120. Supply line 116 may also be provided with an upstream manual valve 122, positioned adjacent the downstream outlet 112 of the liquid supply source 114, for manually regulating the flow of the supplied liquid into the system 110. Within supply line 116, and between the valves 118 and 122, a fluid pump 124 is provided. In the illustrated embodiment, the fluid pump 124 is configured to supply the liquid containing particulates through a strainer 126, past valve 118 and into the upstream inlet 128 of the gas supply assembly 130A at a flow rate and pressure greater than the flow rate and pressure of the liquid containing particulates exiting the liquid supply source 114.

In system 110, a first gas supply assembly, shown generally at 130A, and a second gas supply assembly 130B, are provided for selectively injecting gases, individually or in combination, into the liquid, which contains particulates, in a first injection chamber 132A and/or a second injection chamber 132B, respectively. Referring initially to the upstream most gas supply assembly, i.e., the first gas supply assembly 130A, the at least one injection chamber 132A includes a first upstream inlet 134A that is in fluid communication with the downstream outlet 112 of the liquid supply source 114 via supply line 116, and a downstream outlet 136A through which a solution of combined liquid and gas is discharged. The gas that is introduced into the injection chamber 132A is received at a second upstream inlet 138A of the injection chamber 132A, which is in fluid communication with the downstream outlet 140A of a pressurized gas supply source 142A via a gas supply line 144A. In one embodiment of the present invention, the gas supply source 142A provides a source of carbon dioxide ($CO_2$) gas. It is understood, however, that the gas supply assembly 130A may include a single gas source or any number of gas sources, as desired, and that any type of gas or gases may be supplied.

In the illustrated embodiment shown in FIG. 5, the gas is provided from the downstream outlet 140A of the gas supply source 142A and into supply line 144A that supplies gas to the second upstream inlet 138A of the injection chamber 132A. Supply line 144A is provided with a gas flow control valve 146A for regulating the flow of the gas into the system 110. Valve 144A may be manually activated or electronically controlled via controller 120. Supply line 144A may also be provided with an upstream manual valve 148A, positioned adjacent the downstream outlet 140A of the gas supply source 142A, for manually regulating the flow of the gas into the system 110. Additionally, within supply line 144A, and between the valves 144A and 148A, a flowmeter 150A is provided, which may also be interconnected with the controller 120. In the illustrated embodiment, the flowmeter 150A is configured to transmit a signal to the controller 120, indicating the rate of flow of the gas through the supply line 144A. In response to receiving the signal from the flowmeter 150A, the controller 120 may regulate the status of the control valve 146A, as to provide the injection chamber 132A with a selectively regulated volume and pressure of gas. Finally, supply line 144A may also include a check valve 152A positioned adjacent the second upstream inlet 138A of the injection chamber 132A, such that the gas and/or liquid provided to the injection chamber 132A is prevented from flowing upstream into supply line 144A.

Downstream of first gas supply assembly 130A, the combined liquid and first gas, i.e., solution of liquid and gas, is discharged from the downstream outlet 136A of the first injection chamber 132A and enters line or conduit 133. Conduit 133 is in fluid communication with first upstream inlet 134B of the injection chamber 132B of the second gas supply system 130B. The injection chamber 132B of the second gas supply system 130B also includes a downstream outlet 136B through which a solution of combined liquid and gas is discharged. The gas that is introduced into the injection chamber 132B is received at a second upstream inlet 138B of the injection chamber 132B, which is in fluid communication with the downstream outlet 140B of a pressurized gas supply source 142B via supply line 144B. In one embodiment of the present invention, the gas supply source 142A provides a source of nitrogen (N$_2$) gas. It is understood, however, that the gas supply assembly 130B may include a single gas source or any number of gas sources, as desired, and that any type of gas or gases may be supplied. It is further understood that either one or both of the gas supply assemblies 130A, 130B may be activated during use of the system 110.

In the illustrated embodiment shown in FIG. 5, the gas is provided from the downstream outlet 140B of the gas supply source 122B and into supply line 144B that supplies gas to the second upstream inlet 138B of the injection chamber 132B. Supply line 144B is provided with a gas flow control valve 146B for regulating the flow of the gas into the system 110. Valve 146B may be manually activated or electronically controlled via controller 120. Supply line 144B may also be provided with an upstream manual valve 148B, positioned adjacent the downstream outlet 140B of the gas supply source 142B, for manually regulating the flow of the gas into the system 110. Additionally, within supply line 144B, and between the valves 144B and 148A, a flowmeter 150B is provided, which may also be interconnected with the controller 120. In the illustrated embodiment, the flowmeter 150B is configured to transmit a signal to the controller 120, indicating the rate of flow of the gas through the supply line 144B. In response to receiving the signal from the flowmeter 150B, the controller 120 may regulate the status of the control valve 144B, as to provide the injection chamber 132B with a selectively regulated volume and pressure of gas. Finally, supply line 144B may also include a check valve 152B positioned adjacent the second upstream inlet 138B of the injection chamber 132B, such that the gas and/or liquid provided to the injection chamber 132B is prevented from flowing upstream into supply line 144B.

Downstream of gas supply assembly 130B, the combined liquid and first and/or second gas, i.e., solution of liquid and gas, is discharged from the downstream outlet 136B of the injection chamber 132B and enters conduit or line 153. Line 153 is in fluid communication with the upstream inlet 154 of particle separator 156. Line 153 may also include a sight glass 158 and/or a pressure indicator 160 between the downstream outlet 136B of the injection chamber 132B and the upstream inlet 154 of the particle separator 156. In one embodiment, the pressure indicator 160 may transmit a signal indicative of the fluid pressure in line 153 to the controller 120.

Still referring to FIG. 5, in the illustrated embodiment, the separator 156 may be in the form of a conventional centrifuge 162. As was described in the prior embodiment, representative centrifuge 162 may be a disk centrifuge such as is available from the Seital Separation Technology division of SPX under its designation SE 161, although it is understood that separator 156 may be of any other brand, type or model, or alternatively may be any other satisfactory type of separation equipment such as, but not limited to, a cyclonic separator, filter press, etc. Within the centrifuge 162, the solution of gas and liquid, containing particulates, is subjected to centrifugal forces in centrifuge 162 that function to remove solids or particles contained within the liquid, in a manner as is known.

In use, the centrifugal force applied to the liquid and gas solution as it passes through centrifuge 162 functions to aid in the absorption and homogenization of the gas into and within the liquid. In this regard, when the clarified gaseous liquid is discharged from the downstream outlet 164 of the centrifuge 162, the gas is as fully absorbed into the liquid as would be the case in a conventional gas injection and serpentine conduit system as described above. The centrifuge 162 thus provides the dual function of solid particulate removal and concurrent gas absorption and homogenization. Resultantly, system 110 eliminates the need for additional serpentine conduit or turbulators for gas absorption as compared to conventional systems in which the gas is injected downstream of the particle separator. In addition, it has been found that the pressure of the gas within the liquid and gas solution is increased as the solution passes through the centrifuge 162. In view of this, the pressure of the gas that is injected into the liquid at gas injection assembly 30 may be lower than the gas pressure required in the prior art in order to achieve the desired degree of absorption and homogenization.

The resultant clarified gasified liquid, or beverage, is then discharged from the downstream outlet 164 of the centrifuge 162 and supplied to a discharge line 166. As shown in FIG. 5, the discharge line 166 may be provided with one or more sensors, including but not limited to a flow sensor 168, a turbidity sensor 170 and/or a gas sensor 172. Any or all of the sensors may be configured to transmit a signal indicative of their respective sensor readings to the controller 120. A sight glass 174 may also be provided along the length of the discharge line 166 to allow viewing of the clarified gasified liquid therein. A flow control valve 176 configured to regulate the flow rate of the liquid and gas solution through centrifuge 162 may also be provided in the discharge line 166. The flow control valve may be a manual valve or an electronic valve, operation of which is controlled by the controller 120. Finally, a manual valve 178 may be provided at the downstream end of the discharge line, which is configured to discharge the clarified gasified liquid or beverage therefrom.

Figure 6:
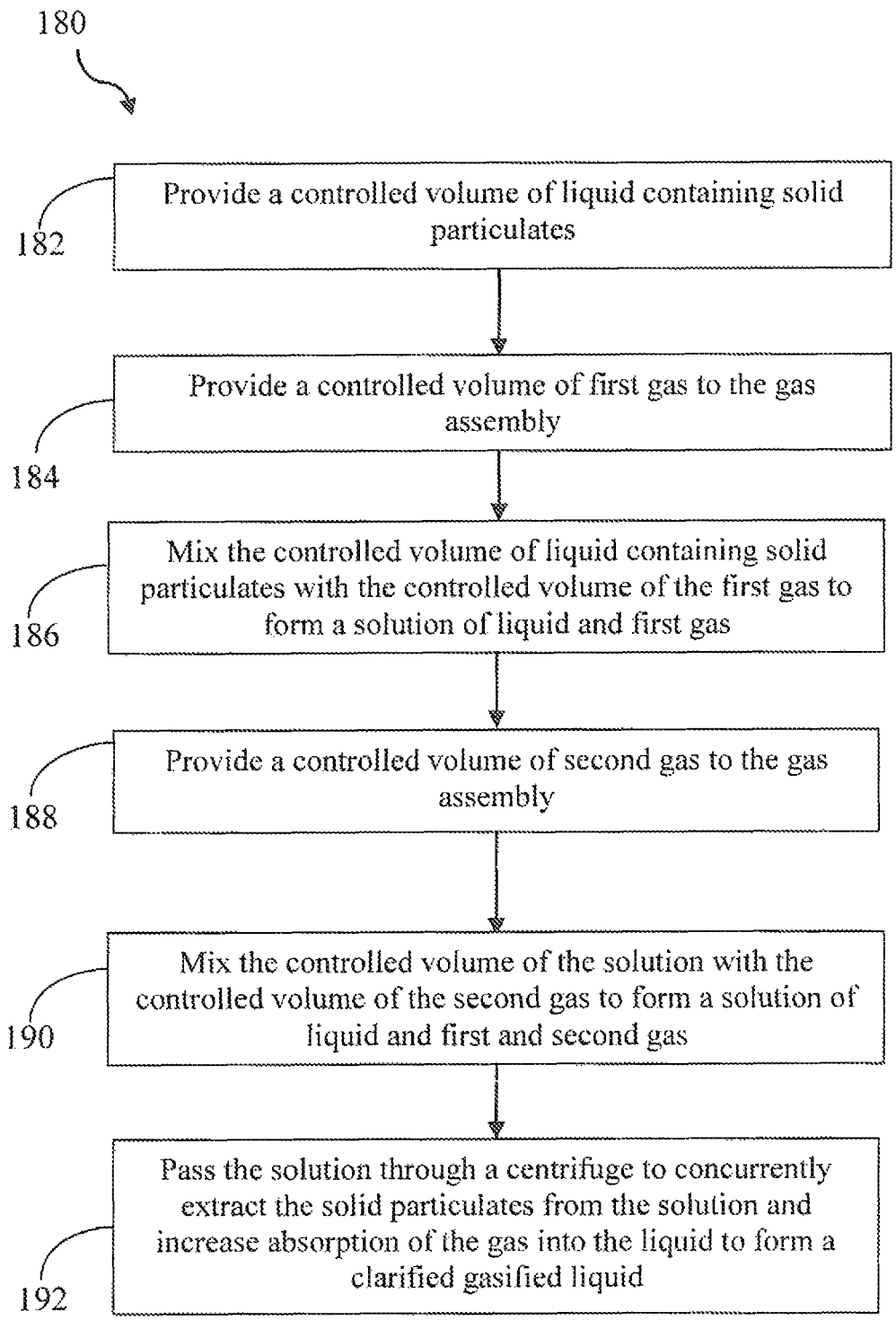
FIG. 6 is a flow chart of a method of using the gasification system of FIG. 1

Referring now to the simplified flow chart represented in FIG. 6, during use of system 110, an exemplary method of manufacturing or forming a clarified gasified beverage is shown at arrow 180. As represented at initial block 182, a controlled volume of a liquid containing solid particulates is introduced into the system 110 by way of a liquid supply source 112 and controlled by regulation of valve 118 via controller 120. At block 184, a controlled volume of a first gas may be provided to the gas supply assembly 130A from the gas supply source 142A via supply line 144A. At box 186, the liquid containing solid particulates is mixed with the first gas provided from the gas supply source 142A at the injection chamber 132A to form a solution of liquid and gas. At block 188, a controlled volume of a second gas may be provided to the gas supply assembly 130B from the gas supply source 142B via supply line 144B. At box 190, the liquid containing solid particulates is selectively mixed with the second gas provided from the gas supply source 142B at the injection chamber 132B to form a solution of liquid and the second gas. At subsequent box 192, the solution of first and/or second gas and liquid is passed through a centrifuge 162 to concurrently extract the solid particulates from the solution and increase absorption of the gas into the liquid, thereby forming a clarified gasified liquid or beverage. In one embodiment of the method 180, the gas is carbon dioxide. In another alternative embodiment, the gas is nitrogen gas, however it should be understood that the application is in no way limited to these gasses, as noted above.

Various alternatives and embodiments are contemplated as being within the scope of the following claims particularly pointing out and distinctly claiming the subject matter regarded as the invention.

I claim:

1. A beverage gasification system, the system comprising:
a liquid supply source including a pump, wherein the liquid supply source provides a liquid containing solid particulates therein;
the liquid supply source having a downstream outlet in fluid communication with a gas supply arrangement, wherein the gas supply arrangement is configured to introduce a gas into the liquid to form a solution of liquid and gas; and
a particle separator separate from and located downstream of the pump of the liquid supply source and downstream of the gas supply arrangement; wherein the particle separator includes an inlet and an outlet, wherein the solution of liquid and gas is supplied to the inlet of the particle separator and wherein the particle separator is operable independently of the pump between the inlet and outlet of the particle separator to concurrently extract the solid particulates from the solution and increase absorption of the gas into the liquid to form a clarified gasified liquid at the outlet of the particle separator.

2. The beverage gasification system of claim 1, wherein the particle separator is a centrifuge.

3. The beverage gasification system of claim 1, wherein the at least one gas supply arrangement comprises at least one injection chamber having:
a first upstream inlet in fluid communication with the downstream outlet of the liquid supply source, and configured to receive the liquid containing solid particulates at the injection chamber;
a second upstream inlet configured to receive the gas from a downstream outlet of a gas supply source;
a downstream, outlet configured to discharge the solution of liquid and gas; and
a length disposed between, the inlets and the outlet wherein the gas is introduced into the liquid containing solid particulates.

4. The beverage gasification system of claim 3 wherein, the gas supply source is a carbon dioxide gas source.

5. The beverage gasification system of claim 3 wherein, the gas supply source is a nitrogen gas source.

6. The beverage gasification system of claim 3, wherein the downstream outlet of the gas supply arrangement is in fluid communication with an upstream inlet of a gas flow control valve configured to selectively regulate the flow rate of the gas to the second upstream inlet of the at least one injection chamber.

7. A beverage gasification system, the system comprising:
a liquid supply source configured to provide a liquid containing solid particulates therein;
the liquid supply source having a downstream outlet in fluid communication with a gas supply arrangement, wherein the gas supply arrangement is configured to introduce a gas into the liquid to form a solution of liquid and gas; and
a particle separator located downstream of the liquid supply source and the gas supply arrangement; wherein the solution of liquid and gas is supplied to the particle separator and wherein the particle separator is configured to concurrently extract the solid particulates from the solution and increase absorption of the gas into the liquid to form a clarified gasified liquid at a downstream outlet of the separator, wherein the downstream outlet of the particle separator is in fluid communication with an upstream inlet of a flow control valve configured to selectively regulate the flow rate of the solution through the particle separator.

8. The beverage gasification system of claim 7, further comprising at least one sensor disposed downstream of the particle separator and upstream of the flow control valve, where the at least one sensor is selected from a group comprising a flow sensor, a turbidity sensor and a gas sensor.

9. A beverage gasification system, the system comprising:
a liquid supply source configured to provide a liquid containing solid particulates therein;
the liquid supply source having a downstream outlet in fluid communication with a gas supply arrangement, wherein the gas supply arrangement is configured to introduce a as into the liquid to form a solution of liquid and gas; wherein the gas supply arrangement comprises at least one injection chamber having a first upstream inlet in fluid communication with the downstream outlet of the liquid supply source, and configured to receive the liquid containing solid particulates at the injection chamber; a second upstream inlet configured to receive the gas from a downstream outlet of a gas supply source; a downstream outlet configured to discharge the solution of liquid and gas; and a length disposed between the inlets and the outlet wherein the gas is introduced into the liquid containing solid particulates, wherein the s supply source comprises first and second gas supply sources, wherein a first injection chamber is in fluid communication with the first gas supply source and a second injection chamber is in fluid communication with the second gas supply source; and
a particle separator located downstream of the liquid supply source and the gas supply arrangement; wherein the solution of liquid and gas is supplied to the particle separator and wherein the particle separator is configured to concurrently extract the solid particulates from the solution and increase absorption of the gas into the liquid to form a clarified gasified liquid at a downstream outlet of the separator.

10. The beverage gasification system of claim 9 wherein the first gas supply source is a carbon dioxide gas source and, the second gas supply source is a nitrogen gas source.

11. A beverage gasification system, the system comprising:
a liquid supply source configured to provide a liquid containing solid particulates therein;
the liquid supply source having a downstream outlet in fluid communication with a gas supply arrangement, wherein the gas supply arrangement is configured to introduce a gas into the liquid to form a solution of liquid and gas; wherein the gas supply arrangement comprises at, least one injection chamber having a first upstream inlet fluid communication with the downstream outlet of the liquid supply source, and configured to receive the liquid containing solid particulates at the injection chamber; a second upstream inlet configured to receive the gas from a downstream outlet of a gas supply source; a downstream outlet configured to discharge the solution of liquid and gas; and a length disposed between the inlets and the outlet wherein the gas is introduced into the liquid containing solid particulates;

wherein the downstream outlet of the gas supply arrangement is in fluid communication with an upstream inlet of a gas flow control valve configured to selectively regulate the flow rate of the gas to the second upstream inlet of the at least one injection chamber;

at least one flowmeter disposed downstream of the gas supply arrangement and upstream of the gas flow control valve; and a particle separator located downstream of the liquid supply source and the gas supply arrangement; wherein the solution of liquid and gas is supplied to the particle separator and wherein the particle separator is configured to concurrently extract the solid particulates from the solution and increase absorption of the gas into the liquid to form a clarified gasified liquid at a downstream outlet of the separator.

12. A method of forming a clarified gasified beverage, comprising the steps of:

operating a pump to supply a volume of a liquid containing solid particulates therein to a gas supply arrangement;

mixing the volume of liquid containing solid particulates therein with a volume of a gas from the gas supply arrangement to form a solution of liquid and gas; and supplying the solution of liquid and as via the pump to an inlet of a particle separator separate from and located downstream of the pump and the gas supply arrangement, wherein the particle separator includes an outlet; and operating the particle separator independently of the pump, wherein the particle separator concurrently extracts the solid particulates from the solution and increases absorption of the gas into the liquid to form a clarified gasified liquid at the outlet of the particle separator.

13. The method of claim 12, further comprising the step of supplying the volume of the gas at the gas supply arrangement, wherein the gas is selected from a group comprising one or more of carbon dioxide gas and nitrogen gas.

14. The method of claim 12, wherein the solution of liquid and gas are in a first gasified state at a downstream outlet of the gas supply arrangement and the clarified gasified liquid is in a second gasified state at a downstream outlet of the particle separator; and wherein a pressure of gas in the solution al the first gasified state is lower than a pressure of gas in the clarified gasified liquid at the second gasified state.

15. The method of claim 14, wherein absorption of the gas increases from the first gasified state to the second gasified state.

16. The method of claim 14, wherein homogenization of the gas and liquid increases from the first gasified state to the second gasified state.

* * * * *

UNITED STATES PATENT AND TRADEMARK OFFICE
CERTIFICATE OF CORRECTION

PATENT NO. : 9,789,450 B2
APPLICATION NO. : 15/213883
DATED : October 17, 2017
INVENTOR(S) : Peter Schultz It is certified that error appears in the above-identified patent and that said Letters Patent is hereby corrected as shown below:

In the Claims

Claim 3, Column 9, Line 40, after "downstream" delete ",";

Claim 3, Column 9, Line 42, after "between" delete ",";

Claim 9, Column 10, Line 19, delete "as" and substitute therefor -- gas --;

Claim 9, Column 10, Line 31, delete "s" and substitute therefor -- gas --;

Claim 10, Column 10, Line 46, after "and" delete ",";

Claim 11, Column 10, Line 56, after "at" delete ",";

Claim 11, Column 10, Line 57, after "inlet" insert -- in --;

Claim 12, Column 11, Line 25, delete "as" and substitute therefor -- gas --.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*